(12) United States Patent
Ishiyama

(10) Patent No.: US 6,961,147 B2
(45) Date of Patent: Nov. 1, 2005

(54) FACSIMILE MACHINE WITH COPYING FUNCTION AND INPUT DEVICE FOR OPERATIONAL INSTRUCTIONS

(75) Inventor: Katsunori Ishiyama, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 911 days.

(21) Appl. No.: 09/782,659

(22) Filed: Feb. 13, 2001

(65) Prior Publication Data

US 2001/0015827 A1 Aug. 23, 2001

(30) Foreign Application Priority Data

Feb. 22, 2000 (JP) ........................................ 2000-044718

(51) Int. Cl.[7] .............................. B41J 5/00; H04N 1/32; H04N 1/00
(52) U.S. Cl. ........................ 358/1.9; 358/468; 358/400
(58) Field of Search ........................ 358/1.9, 468, 400; D14/440, 345, 392, 396; 455/557, 575.3; 399/401

(56) References Cited

U.S. PATENT DOCUMENTS

| | | |
|---|---|---|
| 5,329,377 A | 7/1994 | Gregg |
| 5,410,419 A * | 4/1995 | Muramatsu et al. ........ 358/468 |
| 5,584,054 A | 12/1996 | Tyneski et al. |
| 5,715,524 A * | 2/1998 | Jambhekar et al. ....... 455/575.3 |
| 5,852,764 A * | 12/1998 | Kida et al. .................. 399/401 |
| 6,046,730 A | 4/2000 | Bowen et al. |
| 6,144,551 A | 11/2000 | Kao |

FOREIGN PATENT DOCUMENTS

| | | |
|---|---|---|
| JP | 6-070071 | 3/1994 |
| JP | 07-177273 | 7/1995 |
| JP | 09-171329 | 6/1997 |
| JP | 11-167457 | 6/1999 |

* cited by examiner

Primary Examiner—Kimberly Williams
Assistant Examiner—Charlotte M. Baker
(74) Attorney, Agent, or Firm—Hogan & Hartson, LLP

(57) ABSTRACT

A fax/copy key (61) is positioned in the center of a cover (130) of a control panel (60). When the cover (130) is closed, a plurality of one-touch speed dial keys (62) are arranged under the fax/copy key (61). In other words, the fax/copy key (61) and the one-touch keys (62) are superposed. At a pivot of the cover (130) is positioned a cover sensor (65) to detect the open/close status of the cover (130). When the fax/copy key (61) is depressed while the cover (130) is closed, several one-touch keys (62) are depressed via a plurality of protrusions (61b) of the fax/copy key (61). Because the cover (130) is closed, the depression of the one-touch keys (62) is interpreted as the depression of the fax/copy key (61). This contributes to miniaturization of the operational input unit (60).

18 Claims, 6 Drawing Sheets

FACSIMILE MACHINE WITH COPYING FUNCTION AND INPUT DEVICE FOR OPERATIONAL INSTRUCTIONS

CROSS REFERENCES TO RELATED APPLICATIONS

This application claims priority under 35 USC 119 of Japanese Patent Application No. 2000-44718 filed on Feb. 22, 2000, the entire disclosure of which is incorporated herein by reference.

BACKGROUND OF THE INVENTION

1. Field of the Invention

The present invention relates to an input device for operational instructions which is incorporated in a facsimile machine, a facsimile machine with a copying function or the like, and more particularly to an operational input device characterized by the way how the operational instructions are input.

2. Description of the Related Art

For example, a facsimile machine with a copying function has many keys in an operation unit in order to instruct details of copying operation, and facsimile operation. More particularly, the operation unit has a fax/copy key to set the machine in a fax mode or a copy mode, a numerical key pad to input fax numbers of the receiving party or the number of copy sheets, a one-touch dial key to set (dial) receiving party's fax numbers, and a start key that starts the scanning of documents. In addition, there are keys used to set applied communication such as broadcasting. Using these keys in an appropriate order can execute desired type of facsimile communication and copying.

However, because these keys are independent and gathered in the operation unit, there has been a limit to miniaturization. Therefore, a system with reduced number of keys has been known where the operational keys with similar functions and not used so often are gathered and arranged in a layered system. However, there has still been a limit for miniaturization even if the keys are arranged in a layered system.

SUMMARY OF THE INVENTION

An object of the present invention is to provide an input device for operational instructions that can contribute further to the miniaturization.

In a first aspect of the present invention, an input device includes a first key, a cover that can be opened and closed accompanying the first key, at least one second key that can be depressed upon depressing of the first key if the cover is closed, a detecting means for detecting whether the cover is open or not, and a control means for judging (recognizing) that the first key has been depressed based on a detection result of the cover detecting means if the cover is closed and the second key(s) is (are) depressed upon depression of the first key. Accordingly, further miniaturization has been made possible.

The input device may further include at least one sheet which is (are) pivotally opened and closed, and at least one sheet detecting means for detecting the open/close status of the respective sheet. The control means may change the function(s) of the second key(s) in accordance with the open/close status of the cover and the sheet(s). The second key(s) will be given multiple functions so that further miniaturization has been made possible.

The first key may further have a plurality of projections on the bottom side thereof in the area opposite to the second key(s). In addition to the effects described above, it can assuredly be checked whether the first key has been depressed or not.

In the following detailed description, the input device corresponds to an operation panel 60, the first key to a fax/copy key 61, the second keys to a plurality of one-touch keys 62, the cover detecting means to a cover open/close sensor 65, the sheet detecting means to a plurality of sheet open/close sensors 66, 67, 68, and the control means to MPU 10, ROM 20 and RAM 30.

BRIEF DESCRIPTION OF THE ACCOMPANYING DRAWINGS

DETAILED DESCRIPTION OF THE INVENTION

A preferred embodiment of the present invention will now be described in detail with reference to the accompanying drawings.

Figure 1:
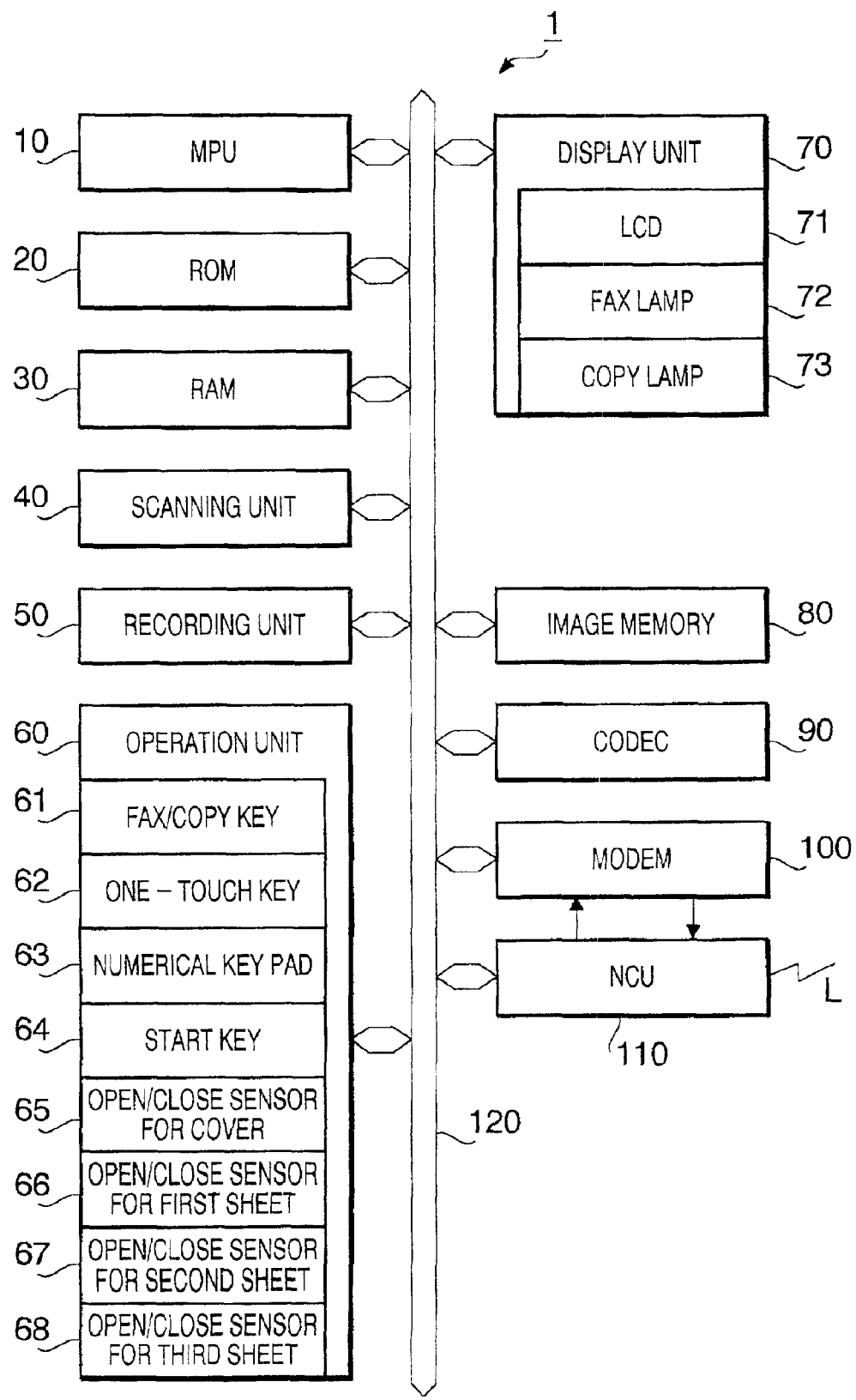
FIG. 1 is a block diagram showing the structure of a facsimile machine with copying function.

Referring to FIG. 1, a facsimile machine with a copying function 1 includes MPU 10, ROM 20, RAM 30, a scanning unit 40, a recording unit 50, an operation panel 60, a display unit 70, an image memory 80, a coder/decoder (CODEC) 90, a modem 100, and NCU 110, and these components are connected to each other on a bus 120.

The MPU 10 controls the components that make up the copy-facsimile machine 1. The ROM 20 stores programs for the control of the copy-facsimile machine 1. The RAM 30 temporarily stores various information concerning the copy-facsimile machine 1.

The scanning unit 40 scans image data on a script (original document) to output black and white binary data. The recording unit 50 is an electro-photographic printer, and records the image data received from remote sources, and image data scanned by the scanning unit 40 during the copy operation.

The operation panel 60 has a plurality of operational keys including a fax/copy key 61 to switch between a fax mode and a copy mode, one-touch speed dial keys 62 to designate previously registered fax numbers, a numerical key pad 63 to input telephone numbers and the number of copy, etc., and a start key 64 to start the operation of scanning a document. The numerical key pad 63 also includes # and*keys.

The structure of the fax/copy key 61 and the one-touch key 62 will now be described in detail referring to the FIGS. 2 to 6.

Figure 2:
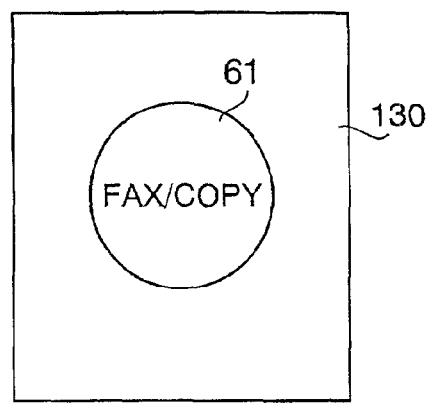
FIG. 2 illustrates a top plan view of a cover and a fax/copy key of the facsimile machine shown in FIG. 1.
Figure 3:
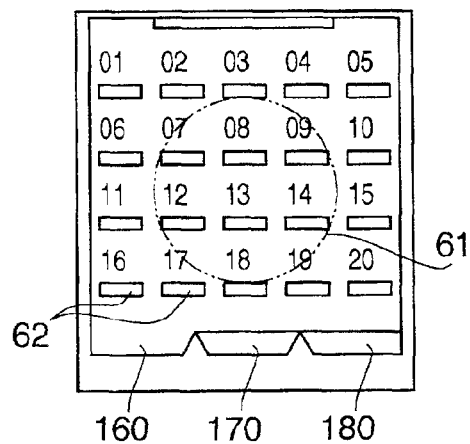
FIG. 3 illustrates a top plan view of one-touch keys and first to third sheets.
Figure 6:
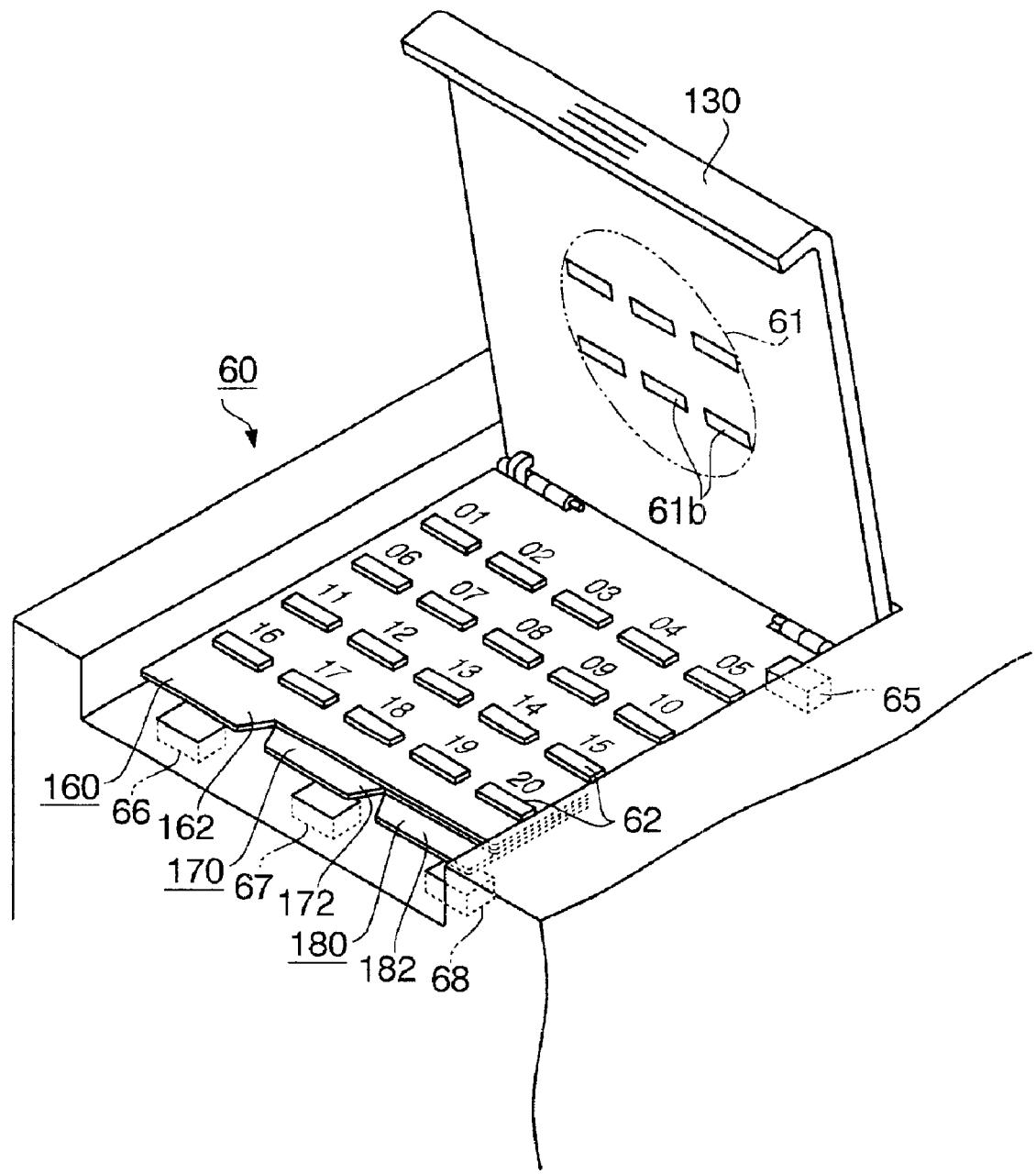
FIG. 6 illustrates a perspective view of the cover, the fax/copy key and the one-touch keys.

As shown in FIGS. 2 and 6, in the center of a cover 130 is the fax/copy key 61. When this cover 130 is opened, the fax/copy key 61 accompanies the cover 130. The fax/copy key 61 opens and closes just as the cover 130 is opened and closed. In other words, the fax/copy key 61 and the one-touch keys 62 are always in superposed relationship. The fax/copy key 61 superposes the one-touch key 62. When the cover 130 is opened, as is shown in FIGS. 3 and 6, twenty (20) one-touch keys 62 appear. Three sheets 160, 170 and 180 are provided below the cover 130 as depicted in FIG. 6.

Figure 4:
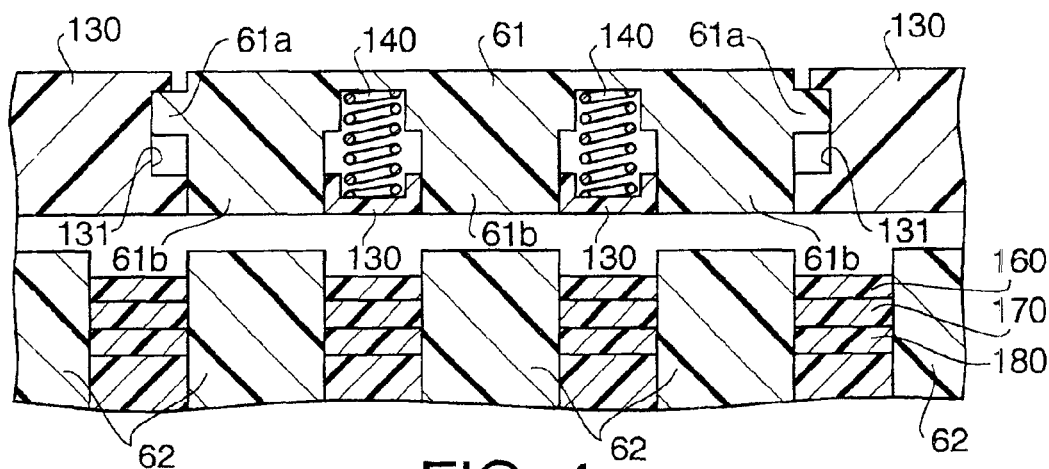
FIG. 4 illustrates a vertical cross sectional view showing the structure of the cover, fax/copy key and the one-touch keys.

Referring to FIG. 4, between the cover 130 and the fax/copy key 61 are coil-springs 140 to support the fax/copy key in the upper position. Around the circumference of the fax/copy key 61 is formed a protrusion 61a. On the cover 130 is formed a groove 131 to be combined with the protrusion 61a, so that when the fax/copy key 61 is depressed 131 against the upward biasing force of the coil-spring 140, the protrusion 61a moves substantially vertically within the range of the mating groove 131. Some of the one-touch keys 62 (in the example shown in FIG. 3 there are six) are directly under the fax/copy key 61. On the bottom of the fax/copy key 61, in the area facing the six one-touch keys, there are a plurality of projections 61b (in the example shown, six). When the fax/copy key 61 is pressed, these protrusions 61b depress a certain one of the one-touch keys 62.

Figure 5A:
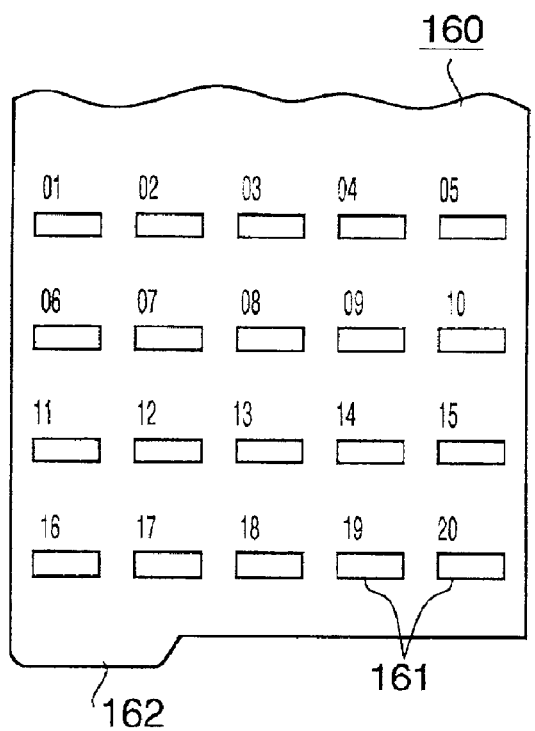
FIG. 5A illustrates a top plan view of the first sheet.
Figure 5B:
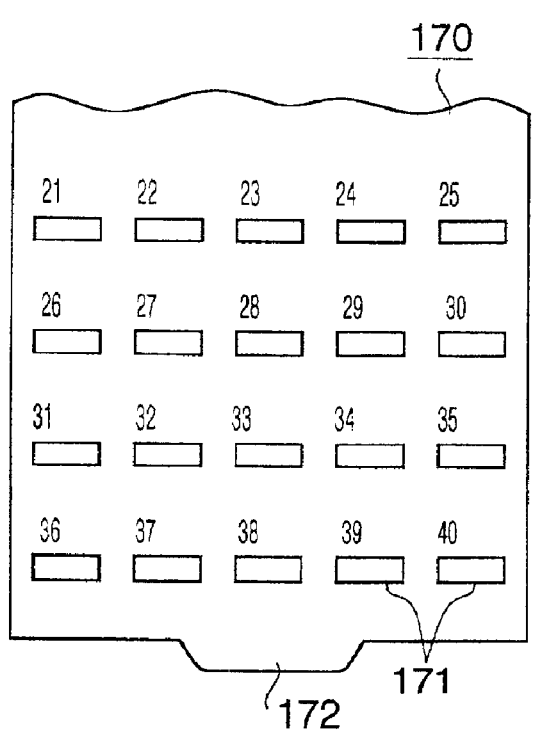
FIG. 5B illustrates a top plan view of the second sheet.
Figure 5C:
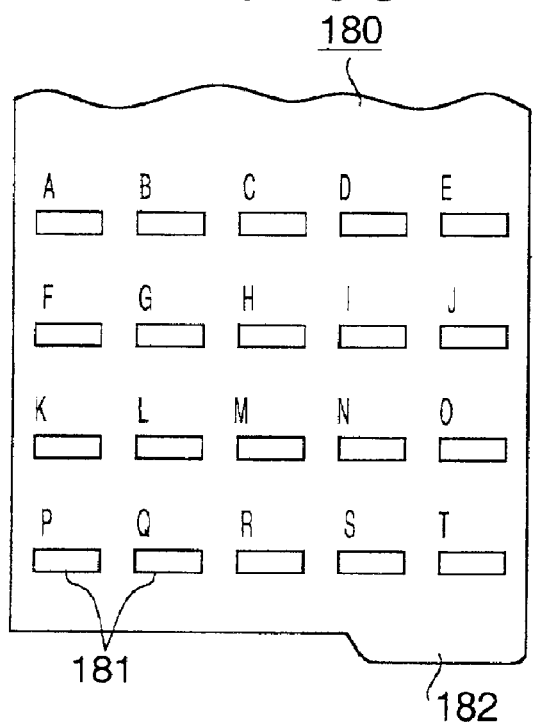
FIG. 5C illustrates a top plan view of the third sheet.
Figure 5D:
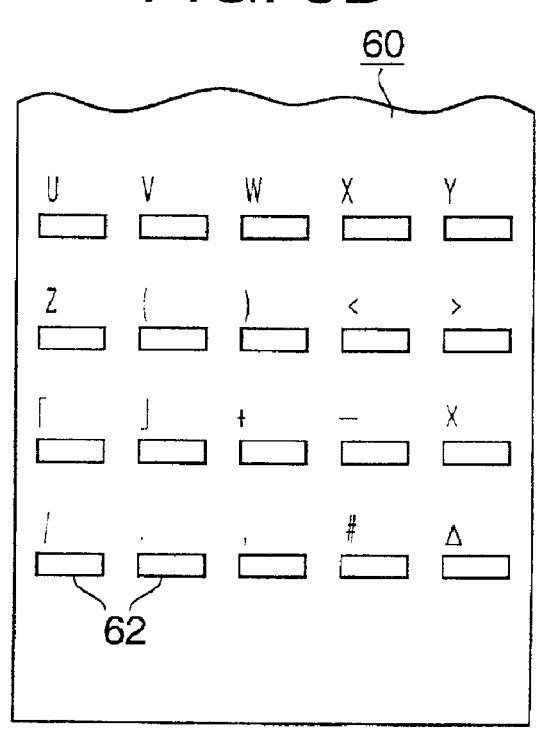
FIG. 5D illustrates a top plan view to show the letters marked on the operation unit when the first to third sheets are opened.

Referring now to FIGS. 5A to 5C, the first, second and third sheets 160, 170, 180 have perforations 161, 171, 181 formed at positions corresponding to the one-touch keys 62 respectively. As is shown in FIG. 5A, the first sheet 160 has numerals from 01 to 20 marked adjacent to the perforations 161. As shown in FIG. 5B, numerals from 21 to 40 are marked adjacent to the perforations 171 made on the second sheet 170. As illustrated in FIG. 5C, alphabets from A to T are marked in the adjacent area of the perforations 181 of the third sheet 180. As is shown in FIG. 5D, after the first to third sheet 160, 170, 180 are opened, there are alphabets from U to Z and fourteen symbols are seen marked in the vicinity of the one-touch keys 62. In other words, these alphabets and symbols are directly marked on the operation panel 60.

As shown in FIG. 6, near the pivot of the cover 130 is an open/close sensor 65 to detect the open/close state of the cover 130. The cover open/close sensor 65 is a photo interrupter in this embodiment. At the further edges of the first to third sheets 160, 170, 180, are formed tabs 162, 172, 182 respectively. At three positions corresponding to the tabs 162, 172, 182 are positioned open/close sensors 66, 67 and 68 to detect the open/close state of the first to third sheets. The first to third open/close sensor 66 to 68 are reflection type photo interrupters.

Referring back to FIG. 1, the display unit 70 includes an LCD 71 to show various kinds of information such as the operational state of the copy-facsimile machine 1, a fax lamp 72 to show that the machine is set for a fax mode by depressing the fax/copy key 61, and a copy lamp 73 to indicate that the machine is set for a copy mode. The fax lamp 72 and the copy lamp 73 include LED.

The image memory 80 temporarily stores image data that has been scanned in the scanning unit 40 or received from remote sources. The CODEC 90 encodes the image data scanned by the scanning unit 40 to transmit it in an appropriate encoding method, such as MH, MR. or MMR. The CODEC 90 also decodes the image data received from remote sources.

The modem 100 modulates and demodulates data that is sent or received in accordance with V.17, V.27ter, V.29 or the like, based on ITU-T.30 recommendation in facsimile transmission procedures. The NCU 110 controls the establishment and breakage of connection with a telephone line L, sends dialing signals corresponding to receiving party's fax numbers, and also detects arrival of a call.

Figure 7:
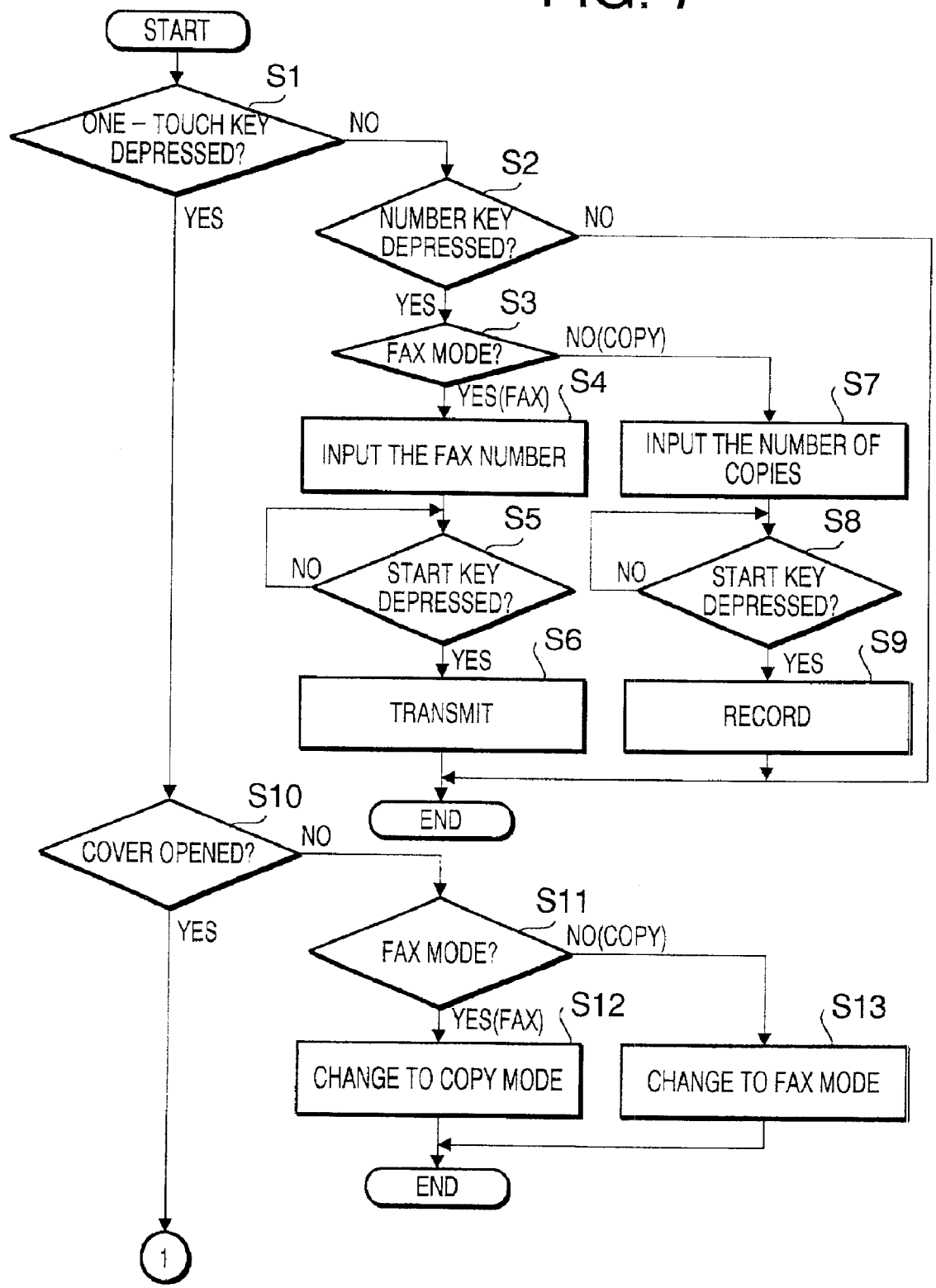
FIG. 7 is a flowchart that shows the operation of the facsimile machine when the fax/copy key and the one-touch keys are depressed.
Figure 8:
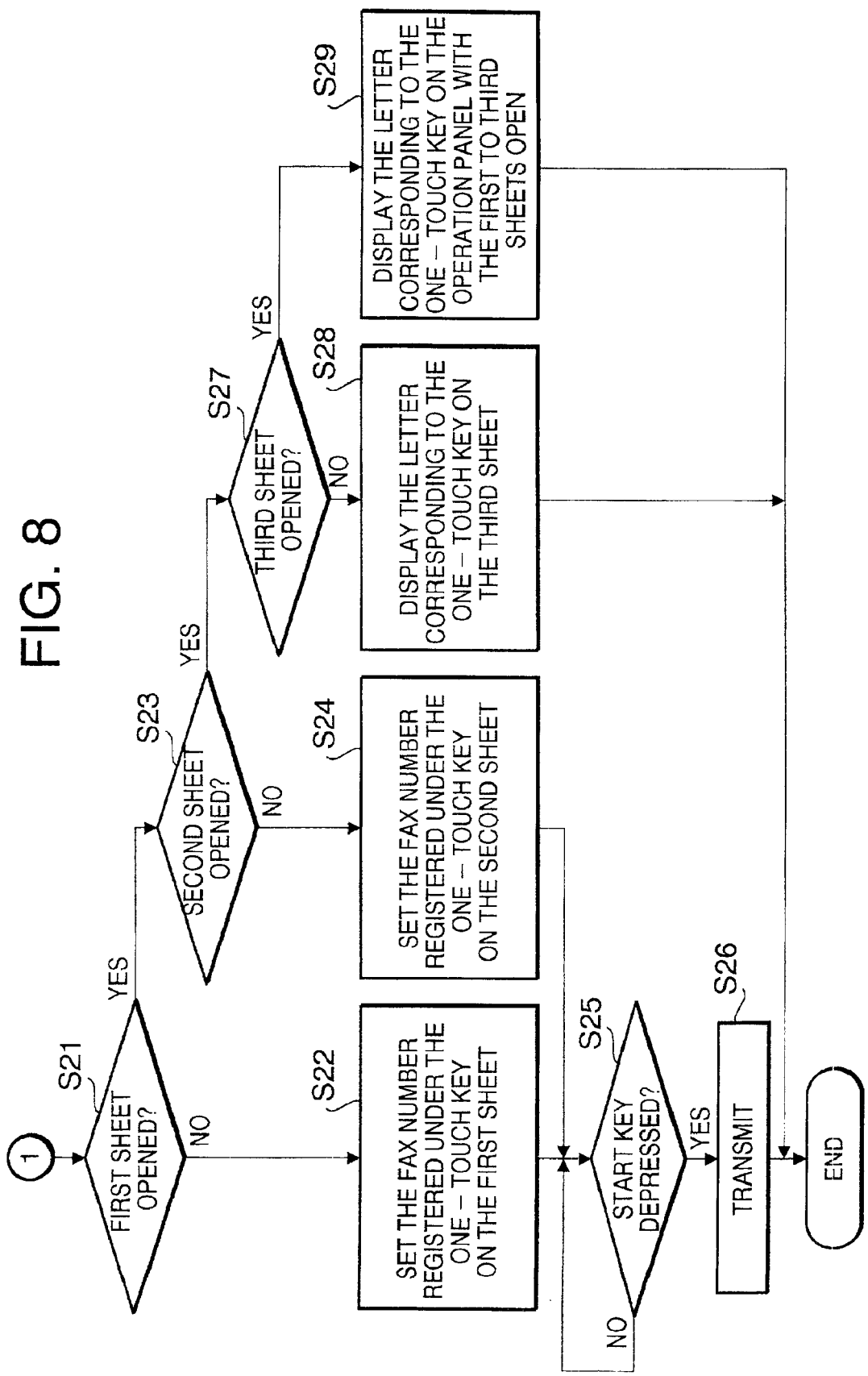
FIG. 8 is a flowchart that shows the operation when the fax/copy key and the one-touch keys are depressed when the cover is open.

Following is the description of the operation of the copy-facsimile machine 1 when the fax/copy key 61 and the one-touch key 62 are depressed in reference to the flow-charts of FIGS. 7 and 8. The operation is controlled by the MPU 10 based on the programs stored in the ROM 20. It is supposed that a script is already placed on the scanning unit 40.

At step S1 in FIG. 7, it is determined whether the one-touch key 62 is depressed or not. When the one-touch key 62 is depressed, the program goes on to step S10. On the other hand, if the one-touch key has not been pressed, the program will go to step S2.

At step S2, it is determined whether the keys on the numerical key pad 63 are depressed or not. When some numerical keys 63 have been depressed, the program will go to step S3. If there have been no depressed keys of the numerical key pad 63, this process will be completed.

At step S3, it is checked whether the present mode is a fax mode or not. If it is in a fax mode, the program will go on to step S4. If it is not in a fax mode, or in other words in a copy mode, the program will go on to step S7.

At step S4, the input from the numerical key pad 63 is considered the fax numbers, and set in the copy-facsimile machine 1. These numbers are also displayed on LCD 71.

At step S5, it is determined whether the start key 64 has been pressed or not. Once the start key 64 is depressed, the operation goes on to step S6. At step S6, the documents are scanned in the scanning section 40 and the NCU 110 originates a call to a receiving party with the fax number set at step S4. Upon establishing of the connection of the line, the image data of the document is transmitted to a designated recipient.

If the machine is in the copy mode, at step S7 the input from the numerical key pad 63 is considered the number of copies, and the number is displayed on the LCD 71 and also set in the copy-facsimile machine 1.

At step S8, whether the start key 64 has bee depressed or not is judged. Once the start key 64 is depressed, the operation goes on to S9. At step S9, the documents are scanned in the scanning unit 40 and the image data scanned from the document is printed on recording sheets in the recording unit 50.

If the one touch speed dial key 62 is pressed, at step S10 it is determined whether the cover 130 is opened or not. Concretely, it is judged based on signals detected by the cover open/close sensor 65. When the cover 130 is opened, in other words, the one-touch keys 62 are visible, the operation goes to step S21 in FIG. 8. On the other hand, when the cover 130 is not open, in other words, the one-touch keys 62 are concealed, and further this means that the fax/copy key 61 is ready to be depressed, the operation goes to S11.

At step S11, it is determined whether the present mode is the fax mode or not. If it is in the fax mode, the program goes on to step S12. On the other hand, if it is not in the fax mode, in other words, in the copy mode, the program goes on to step S13.

At step S12, the mode is changed from the fax mode to the copy mode. At this time, the fax lamp 72 is put out and the copy lamp 73 is lit. As a result, it is made possible to check that the mode is changed from the fax mode to the copy mode.

At step S13, the mode is changed from the copy mode to the fax mode. At this time, the fax lamp 72 is lit and the copy lamp 73 is put out, showing that the mode is changed from the copy mode to the fax mode.

At step S21 in FIG. 8, it is determined whether the first sheet 160 is opened or not. Concretely, it is determined based on signals from the first sheet sensor 66. When the first sheet 160 is open, the program goes on to step S23. On the other hand, when the first sheet 160 is not open, the program proceeds to step S22.

At step S22, a fax number of a recipient registered under a certain one-touch key 62 on the first sheet 160 is displayed on the LCD 71, and also set in the copy-facsimile machine 1.

At step S23, it is determined whether the second sheet 170 is open or not. Concretely, it is determined based on signals from the second sheet sensor 67. When the second sheet 170 is open, the program goes to step S27. On the other hand, when the second sheet 170 is closed, the program goes to step S24.

At step S24, a fax number of a recipient registered under a certain one-touch key on the second sheet 170 is displayed on the LCD 71, and also set in the copy-facsimile machine 1.

At step S25, it is determined whether the start key 64 has been depressed or not. Once the start key 64 is depressed, the program goes to step S26. At step S26, the document is scanned by the scanner 40, and the NCU 110 originates a call to the fax number of the recipient set in said step S22 or S24. Once the connection of the line is established with the receiver, the image of the document is transmitted.

If both of the first and second sheets 160 and 170 are open, it is determined at step S27 whether the third sheet 180 is open or not. Opening and closing of the third sheet 180 is determined based on the signals from the third sheet sensor 68. When the third sheet 180 is open, the program goes on to step S29. When the third sheet is closed, the program goes to step S28.

At step S28, a letter (alphabet A to T) that corresponds to the one-touch speed dial keys 62 on the third sheet 180 that has been depressed will be displayed on LCD 71. At step S29, one of the letters made visible after the first to third sheets 160, 170, 180 have been opened (alphabet U to Z and 14 symbols), which corresponds to the depressed one of the one-touch keys is displayed on the LCD 71.

As understood from the foregoing, the embodiment has the following advantages.

(1) In the center of the cover 130, the fax/copy key 61 is positioned. When the cover 130 is closed, below the fax/copy key 61 are one-touch keys 62 arranged. In other words, the fax/copy key 61 and the one-touch keys 62 are positioned in superposed relation occupying the same horizontal positions, although in different phases on vertical phases. At the position adjacent to the base of the cover 130 is attached the cover sensor 65 to detect whether the cover 130 is open or not. So, when the cover 130 is closed and the fax/copy key 61 is pressed, although one or more of the one-touch keys 62 are depressed via the projections 61b, it is determined the fax/copy key 61 has been depressed because the cover is closed. As a result, instead of layered structure in the conventional structure, the input device 60 embodying the present invention further contributes to the miniaturization of the copy-facsimile machine 1.

(2) Each of the one-touch keys 62 has a plurality of functions depending on the open/close status of the first to third sheets 160, 170, 180 and the cover 130. In other words, depending on the combination of the open/close status of the cover 130, the first to third sheets 160, 170, 180 and the one-touch keys 62, the functions of each one-touch key 62 changes. As a result, miniaturization of the operation unit 60 has been enhanced, and the copy-facsimile machine 1 as a whole can be miniaturized.

(3) On the bottom of the fax/copy key 61 are formed a plurality of projections 61b (in the present embodiment, six). As a result, when the fax/copy key 61 is depressed against the upholding force of the coil-spring 140, one or more of the one-touch keys 62 are also depressed via a plurality of the projections 61b. As a result, whatever position of the fax/copy key 61 is pressed, the one touch keys 62 are assuredly pressed. Thus, the machine can reliably check if the fax/copy key 61 has been depressed. The switch between the fax mode and the copy mode can be secured accordingly.

(4) When the first sheet 160 or the second sheet 170 is exposed, a fax number registered in accordance with a corresponding one of the one-touch keys 62 is displayed on the LCD 71 and also set in the copy-facsimile machine 1. When the third sheet 180 or the operation panel 60 is exposed, a letter corresponding one of the one-touch keys 62 is displayed. As a result, there is no need to set a separate letter mode. In accordance with the open/close status of the cover 130 and the first to third sheets 160, 170, 180 each one-touch key 62 can be used both for the setting of fax numbers and the inputting of letters.

The present invention is not limited to the embodiment shown and described above, and other embodiments and modifications according to the present invention will be described below.

In the above-described embodiment, the shift between fax number input and letter input is done by changing the sheets. Instead, by installing a key for setting a letter mode, each one-touch key can be used both for fax numbers and letters with the change of the mode. For example, in this altered embodiment, both "01", and "A" may be marked in the adjacent area of the perforation 161 on the first sheet 160. In the fax mode, when the one-touch key 62 corresponding to the perforation 161 is depressed, a fax number registered under "01" is input, and in the letter mode, when the same one-touch key 62 corresponding to the perforation 161 is depressed, "A" is input.

In another modified example, the change of the modes can be done with the use of the switching of the fax and copy. For example, in the fax mode, when the one-touch key 62 corresponding to the perforation 161 with "01" and "A" marked nearby is depressed, a fax number registered under the one-touch key may be automatically input, while in the copy mode, the letter "A" is input automatically. In this structure, there is no need to install a key for setting the letter mode to input both the fax number of the receiving party and letters and symbols with the same one-touch keys 62.

Although the illustrated input device 60 includes the three sheets, i.e., the first to third sheets 160, 170, 180, it may include two or four or more sheets.

In the first embodiment, the fax/copy key 61 and the one-touch speed dial keys 62 are arranged in the superposed relation. Instead, the one-touch speed dial keys and quick dial keys (not shown) may be provided in the superposed relation. The quick dial keys are used to register abbreviated numbers and/or make a call using the abbreviated numbers (not shown).

The coil spring 140 may be replaced by a leaf spring. A plurality of leaf springs, made of resin, may be located between the protrusions 61*a* and the combination groove 131. These leaf springs may be formed in one piece with the fax/copy key 61 or the cover 130. An elastic material can be used for the fax/copy key 61 to make it elastic on its own. The number of the projections 61*b* formed on the bottom of the fax/copy key 61 may be four instead of six.

What is claimed is:

1. An operational instruction input device comprising:
    a first key;
    a cover which is opened and closed accompanying the first key;
    at least one second key which is depressed in accordance with the depression of the first key under the condition that the cover is closed;
    a cover detector for detecting an open/close status of the cover;
    a control unit that determines that the first key has been depressed when the at least one second key is depressed upon depression of the first key if the cover is closed, based on a detection result of the cover; and
    at least one sheet that can be opened and closed, and at least one sheet detector for detecting an open/close status of the respective sheet, and wherein the control unit changes functions performed by the respective second key in accordance with the open/close status of the respective sheet and the cover.

2. The operational instruction input device as recited in claim 1, wherein the first key has a plurality of protrusions formed on its bottom side facing the at least one second key.

3. The operational input device as recited in claim 1, wherein the first key has a plurality of protrusions formed on its bottom side facing the at least one second key.

4. The operational instruction input device as recited in claim 1, wherein the at least one sheet includes a plurality of sheets arranged in superposed relationship with each other.

5. The operational instruction input device as recited in claim 1, wherein the first key is used for switching between a fax mode and a copy mode, and the at least one second key is a plurality of one-touch speed dial keys.

6. The operational instruction input device as recited in claim 1, wherein the control means determines whether to set a fax number or input letters in accordance with the open/close status of the respective sheet and the cover.

7. The operational instruction input device as recited in claim 1, wherein the at least one sheet is located below the cover.

8. The operational instruction input device as recited in claim 4, wherein the plurality of sheets are located below the cover.

9. The operational instruction input device as recited in claim 4, wherein the cover and the plurality of sheets are pivotable about a substantially common pivot.

10. A facsimile machine with a copying function, comprising:
    a first key to switch between a copy mode and a fax mode;
    a cover that can be opened and closed together with said first key;
    at least one second key depressed upon depression of said first key when the cover is closed;
    a cover detector for detecting an open/close status of the cover; and
    a controller for switching between the copy mode and the facsimile mode when said at least one second key is depressed by the depression of said first key while the cover is closed.

11. The facsimile machine with a copying function as recited in claim 10 further including at least one sheet that can be opened and closed, and at least sheet detector for detecting an open/close status of the respective sheet, and wherein the controller switches functions of the respective second key in accordance with the open/close status of the cover and the respective sheet.

12. The facsimile machine with a copying function as recited in claim 11, wherein the at least one second key is used as a one-touch speed dial key or for another function in accordance with the open/close status of the at least one sheet.

13. The facsimile machine with a copying function as recited in claim 12, wherein said another function is a function to input a letter.

14. The facsimile machine with a copy function as recited in claim 11, wherein the at least one sheet is located below the cover.

15. The facsimile machine with a copy function as recited in claim 11, wherein the at least one sheet includes a plurality of sheets arranged in superpose relationship with each other.

16. The facsimile machine with a copy function as recited in claim 15, wherein the plurality of sheets are arranged below the cover.

17. The facsimile machine with a copy function as recited in claim 11, wherein the cover is a generally planar member, the first key is provided at the center of the cover, and the cover is generally planar with a main body of the facsimile machine when the cover is closed.

18. The facsimile machine with a copy function as recited in claim 17, wherein the main body of the facsimile machine has a recess, and the at least one sheet is received in the recess.

* * * * *